Jan. 12, 1932.  A. F. FROUSSARD  1,840,498
VALVE
Filed Sept. 27, 1929    2 Sheets-Sheet 1
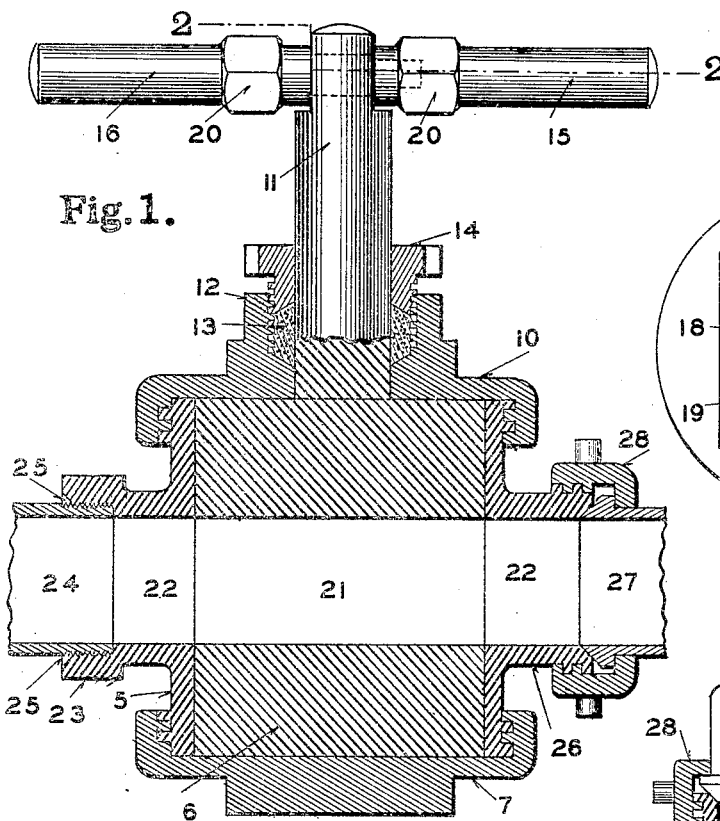
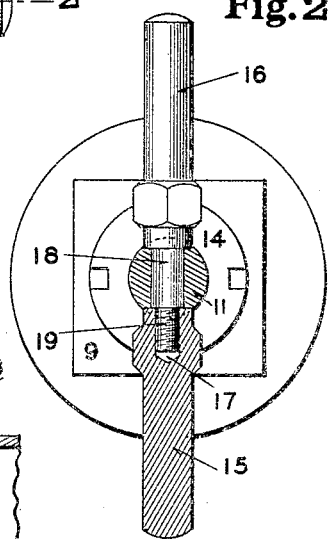
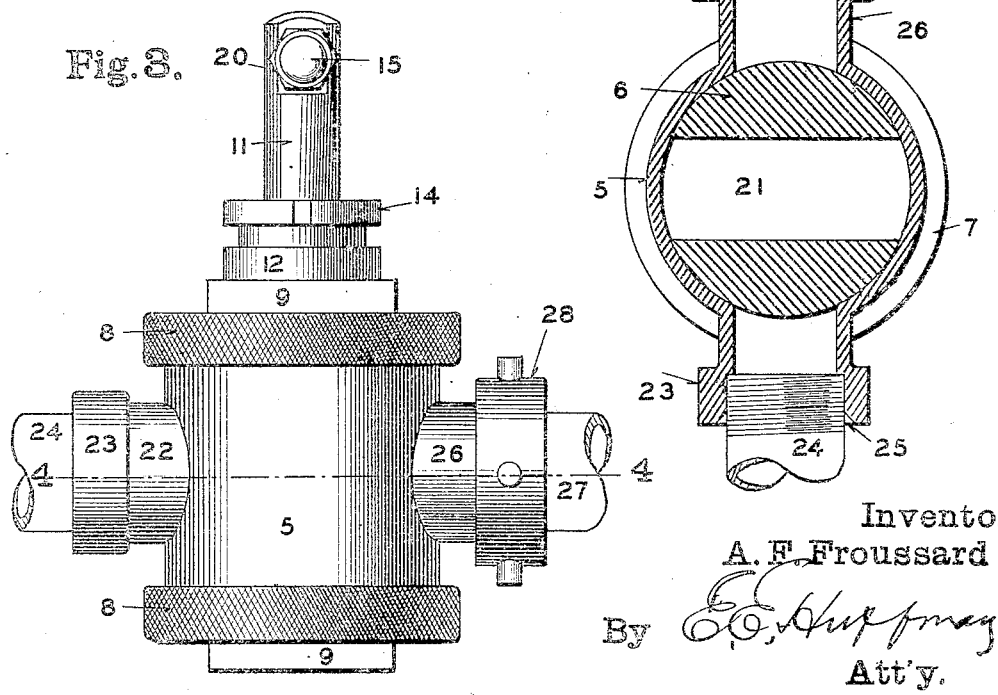
Inventor
A. F. Froussard
By E. E. Huffman
Att'y.

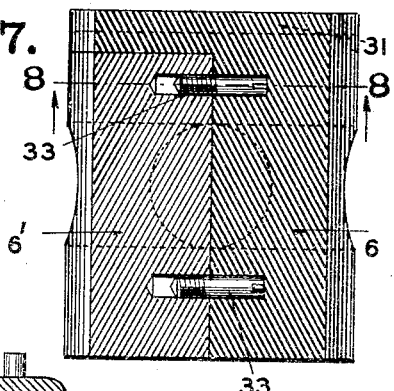
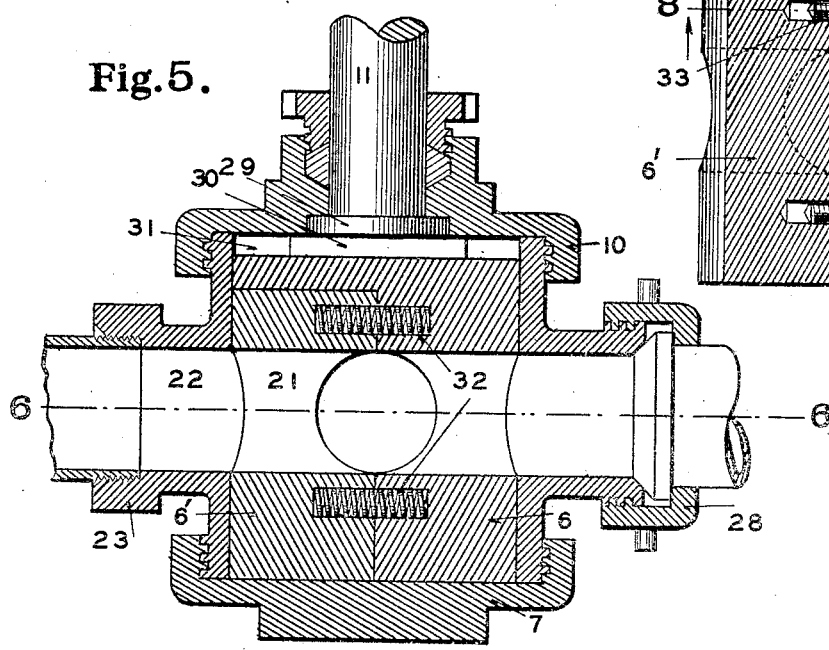
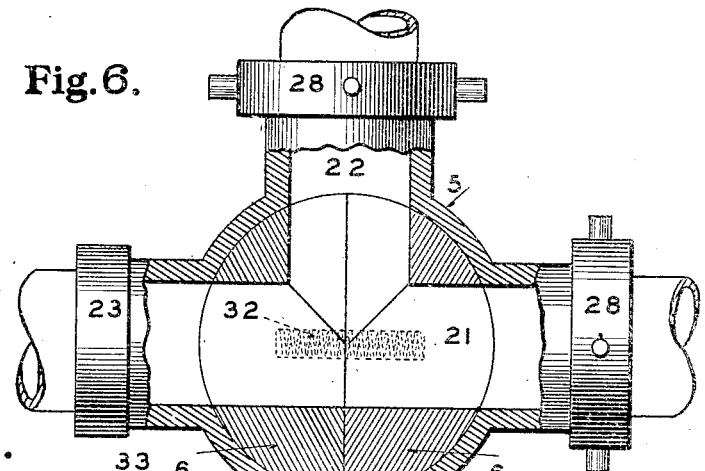
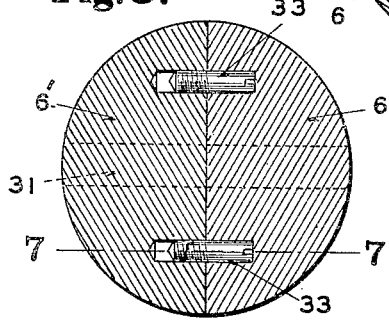

Patented Jan. 12, 1932

1,840,498

UNITED STATES PATENT OFFICE

ALBERT F. FROUSSARD, OF ST. LOUIS, MISSOURI

VALVE

Application filed September 27, 1929. Serial No. 395,553.

My invention relates to a valve and particularly to the kind known as sanitary valves, such as are used to control the flow of milk, cream, or the like, through the pipe lines of dairies or creameries. Heretofore such valves, when of the plug type as is usual, have the plug tapered to secure a light joint and to compensate for wear by adjustment of the plug in the direction of the length of the bore. It has been found, however, that such valves when adjusted by the ordinary attendants, as must be done daily when the valves are taken apart for cleaning, are quite often either adjusted too loosely, so as to leak, or too tightly, so as to offer undue resistance to the turning of the plug. When the latter condition occurs the handles are bent or broken off, requiring constant repair. It is the object of my invention to provide a simple and easily cleaned valve which will overcome the above mentioned objectionable features.

In the accompanying drawings, which illustrate some forms of valve made in accordance with my invention, Figure 1 is a vertical section; Figure 2 is partly a plan view on a reduced scale of the upper cap and handle and partly a section taken on the line 2—2 of Figure 1; Figure 3 is a side elevation also on a reduced scale; Figure 4 is a section taken on the line 4—4 of Figure 3; Figure 5 is a view similar to Figure 1 but showing a modification; Figure 6 is a section taken on the line 6—6 of Figure 5; Figure 7 is a vertical section (taken on the line 7—7 of Figure 8) through the valve plug showing a further modification; and Figure 8 is a section taken on the line 8—8 of Figure 7.

The valve is made entirely of brass, Monel metal or other material which will not rust or corrode by contact with the milk or cream. The body 5 of the valve is provided with a straight bore in which is situated plug 6 of uniform diameter from end to end. The lower end of the bore is closed by a screw cap 7. In order to provide means for rotating the cap it is either provided with a knurled edge 8 or with a square wrench engaging projection 9 but preferably with both as shown. The cap 10 closing the upper end of the bore is also screwed into position and is provided with knurled edge and square projection like the cap 7. The threads of both these caps should be either of square or acme form to lessen the wear due to the daily dismantling and reassembly of the valves. Cap 10 is provided with a central opening for the passage of the stem 11 of the plug. Surrounding the stem is a stuffing box 12 in which packing 13 is compressed by a screw gland 14 to form a tight joint between the cap and stem. The stem 11 is provided with a removable handle formed of two parts 15 and 16. Part 15 is provided with a threaded opening 17 at its inner end and part 16 with a reduced stud 18 passing through a cross opening in the stem and a threaded pin 19 engaging the opening 17. Both parts have hexagonal portions for engagement with a wrench.

The plug is provided with a port 21 which, when the valve is in open position as shown in Figure 1, communicates with inlet and outlet openings 22 in the casing. One of these openings extends through a coupling nipple 23 which is permanently secured to a line pipe 24. The permanent connection is secured by providing the pipe and nipple with fine threads and sweating the parts together after the pipe has been screwed into position. I chamfer the outer edge of the nipple opening, as shown at 25, to provide a V-shaped annular groove to contain the solder during the operation of sweating. The other opening 22 extends through a nipple 26 which is detachably secured to a line pipe 27 by the usual threaded union 28.

While the solid plug valve above described will remain tight a long time, it is sometime desirable to provide means for compensating for wear of the plug. Such means I have shown in Figures 5 to 8. In these forms the stem 11 is made separate from the plug and provided with a retaining collar 29 and a key 30, the latter engaging with a transverse keyway 31 in the top of the plug. The plug is divided along a central vertical line to a point near its upper end so that it consists of a main L-shaped part 6 and a relatively movable part 6'. Between the two parts is situated means for forcing the parts in opposite directions against the interior face of the valve casing to compensate for wear. In Figures 5 and 6 I have shown automatic means for the purpose consisting of a pair of helical springs 32 set into aligning openings in opposing faces of the two parts. In Figures 7 and 8 I have the compensating means consist of pins 33 threaded into openings in the part 6' and having their projecting ends abutting against the ends of the aligning openings in part 6. In this latter form when the plug becomes worn it is necessary to separate the two parts of the plug and unscrew the pins 33 a slight distance to secure the necessary compensation. The key connection between the stem and plug transmits the rotary motion of the former to the latter without interfering with the relative lateral movement of the two parts of the plug.

While I have shown the compensating springs as two in number and the pins as four, it will be understood that the number of either may be varied as desired. Further, while I have shown the solid plug valve as a two-way valve and the divided plug as a three-way valve, either form of plug may be used for either, or any other type of valve.

Having fully described my invention, what I claim as new and desire to secure by Letters Patent of the United States is:

In a sanitary valve, the combination with a valve body having a bore, of a plug in said bore, said plug comprising a main L-shaped part and a relatively movable part, said parts having opposing faces, and pins threaded into the opposing face of one of said parts and forming adjustable stops abutting against the opposing face of the other of said parts to compensate for wear.

In testimony whereof, I hereunto affix my signature, this 24th day of September, 1929.

ALBERT F. FROUSSARD.